Aug. 4, 1942.  F. D. JONAS  2,291,724
FILING FOLDER
Filed Nov. 10, 1939  4 Sheets-Sheet 1

INVENTOR.
Frank D. Jonas
BY Darby & Darby
ATTORNEYS

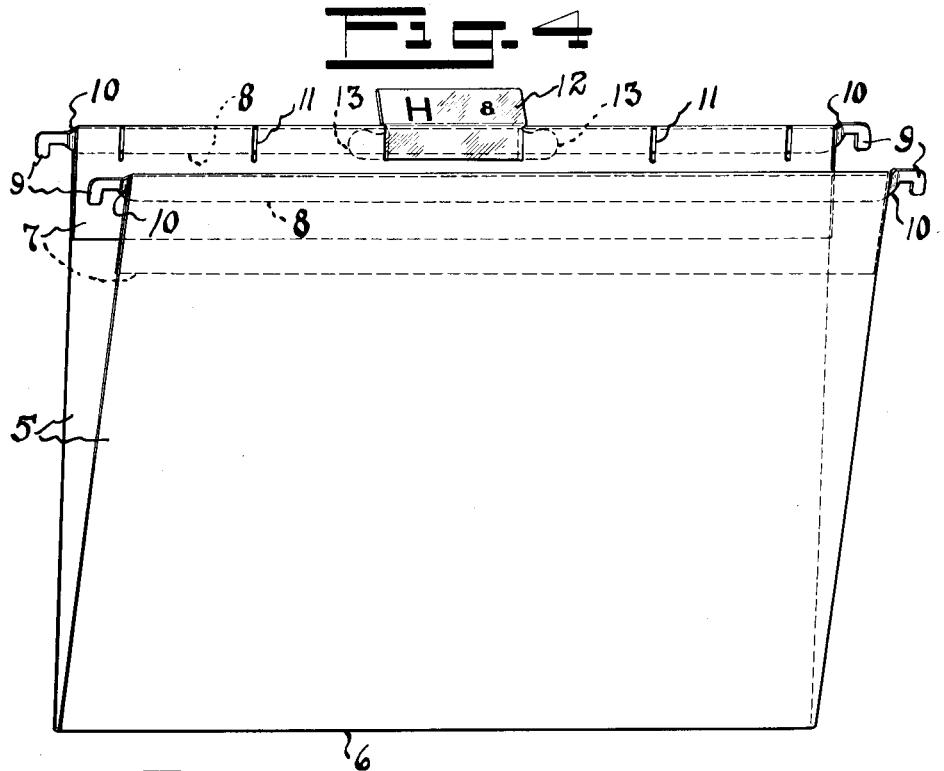
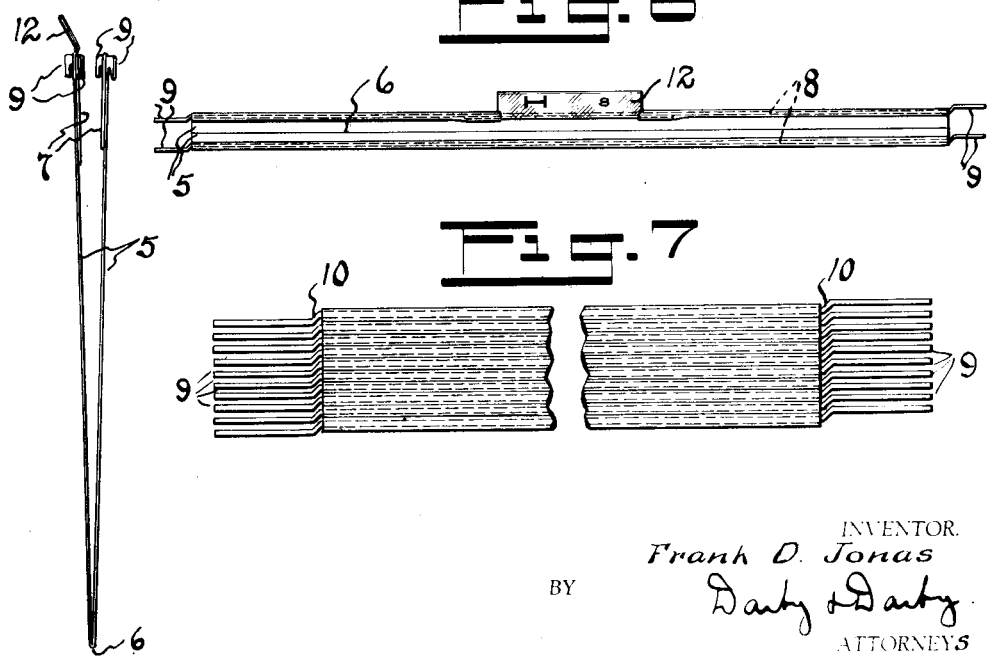

Aug. 4, 1942.  F. D. JONAS  2,291,724
FILING FOLDER
Filed Nov. 10, 1939  4 Sheets-Sheet 3
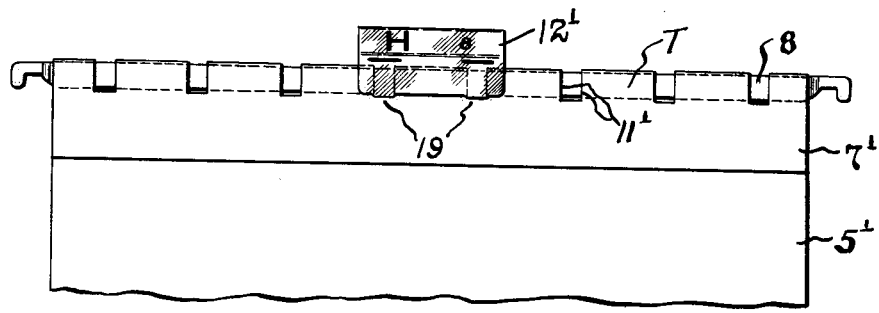
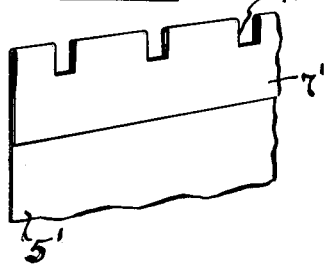
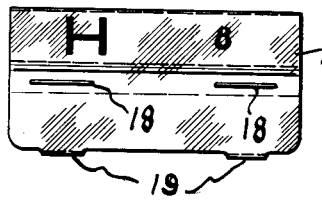
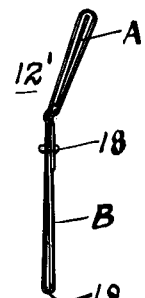
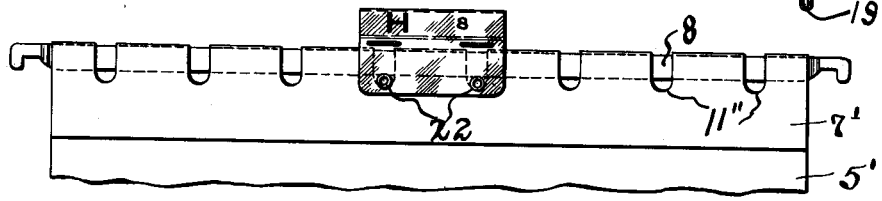
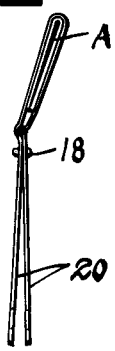
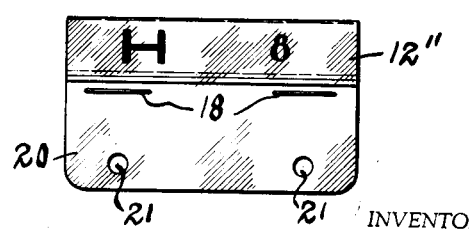
INVENTOR.
Frank D. Jonas
BY
ATTORNEYS

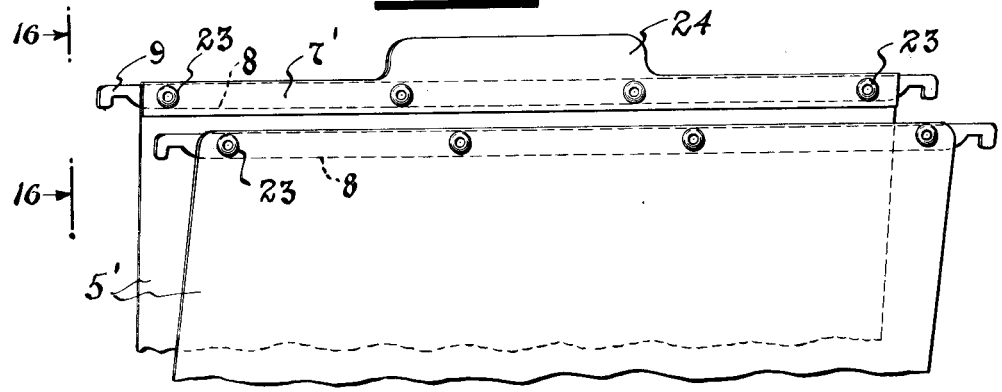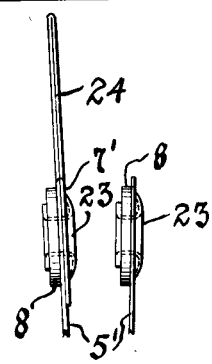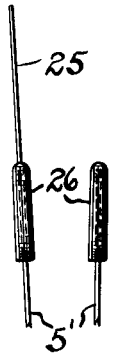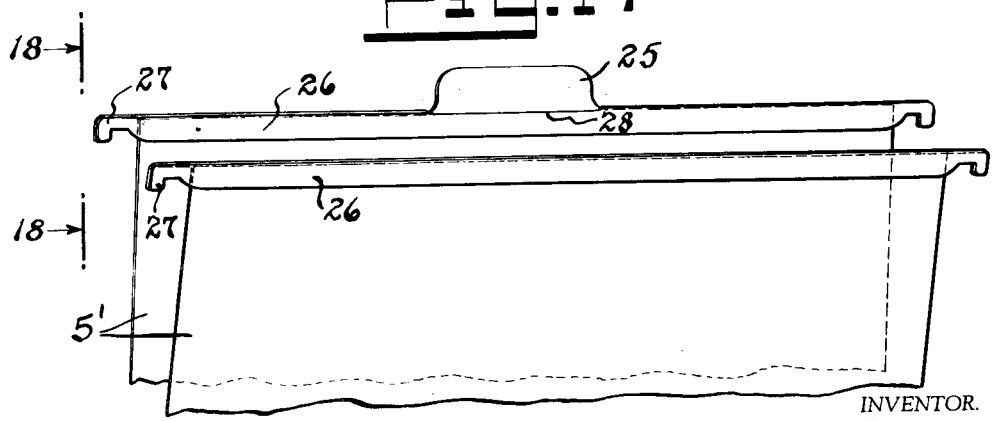

Patented Aug. 4, 1942

2,291,724

UNITED STATES PATENT OFFICE 2,291,724

FILING FOLDER

Frank D. Jonas, East Williston, N. Y., assignor to Oxford Filing Supply Co., Brooklyn, N. Y., a partnership Application November 10, 1939, Serial No. 303,729

9 Claims. (Cl. 129—16)

This invention is concerned with improvements in filing folders with special reference to a form of filing folder in which the receptacle for papers and documents is suspended from above in any suitable form of container or on any suitable form of rack.

The invention is concerned particularly with improvements in the features of construction of this type of suspended filing folder by means of which the component parts may be manufactured by simple inexpensive production methods in large quantities and rapidly assembled without special equipment.

A further object of the invention is the provision of a particular form of construction of suspension bar for the filing pockets which may be readily assembled therewith and which are not easily displaced after assembly.

A further object of the invention is the provision of a suitable container for a set of filing folders of this type which acts to embody them in a unit readily handled and at the same time to protect them.

A further object of the invention is the provision of an improved form of spacer device for separating the filing folders into desired groups and facilitating the handling thereof in use.

A still further object of the invention is the provision of novel forms of index tabs for use in cooperation with the specific types of supports for the filing folders of this invention, and arrangements for attaching and detaching them.

A still further object of the invention involves the construction of the supporting bars for the depending folders so that they are at the same time locked in place and so shaped in form as to properly nest with each other when the folders are employed in groups.

These and other objects are successfully secured by means of the construction herein disclosed, as will be apparent from the following description.

This invention resides substantially in the combination, construction, arrangement and relative location of parts, all as will be described in detail below.

In the accompanying drawings there is shown in Figure 1 in perspective view a complete filing folder unit including the casing in accordance with one form of this invention;

Figure 4 is a front elevational view of one of the filing folders;

Figure 5 is an end elevational view thereof;

Figure 6 is a top plan view thereof;

Figure 7 is a top plan view of a plurality of these filing folders showing the manner in which they nest in groups;

Figure 8 is a front elevational view of the rear wall of a modified form of filing folder in accordance with this invention including the index tab;

Figure 9 is another perspective view of a portion of the rear wall of such filing folder;

Figure 10 is a front elevational view of the form of index tab shown in Figure 8;

Figure 11 is an end elevational view of this index tab;

Figure 12 is a view similar to Figure 8 of a further modified arrangement employing a different form of index tab;

Figure 13 is an enlarged front elevational view of the index tab of Figure 12;

Figure 14 is an end elevational view of this tab;

Figure 15 is a front elevational view of a still further modified form of filing folder, supporting means and index tab;

Figure 16 is an enlarged detail end elevational view of the arrangement of Figure 15 looking from the plane 16—16;

Figure 17 is a view similar to Figure 15 of a final modification; and

Figure 18 is a view of the structure of Figure 17 from the plane 18—18.

The invention herein disclosed is in connection with a type of filing folder for papers, documents and the like consisting, generally speaking, of a single sheet of suitable fibrous material folded along a medial line to provide what may be termed a V-shaped pocket adapted to be suspended from the free edges of the walls forming the pocket. In accordance with the structure herein disclosed this suspension is accomplished by bars or rods attached in different ways to the free edges of the pocket walls so as to insure against displacement.

There are provided various forms of index tabs as illustrated for designating the contents of the individual pockets, which index tabs are associated with the pockets by various constructions to permit of suitable relative arrangements thereof. Likewise these index tabs are illustrated as attached in different ways not only for the purpose of securing them in place, but for insuring the holding of the suspension rods in place.

Figure 1:
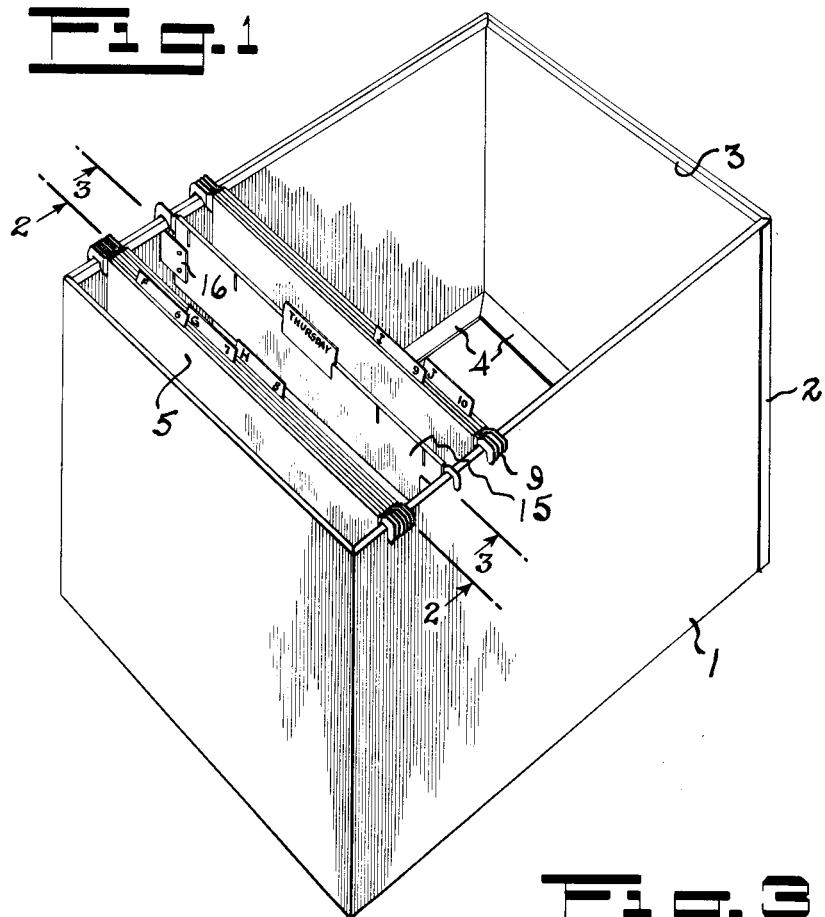
Figure 2:
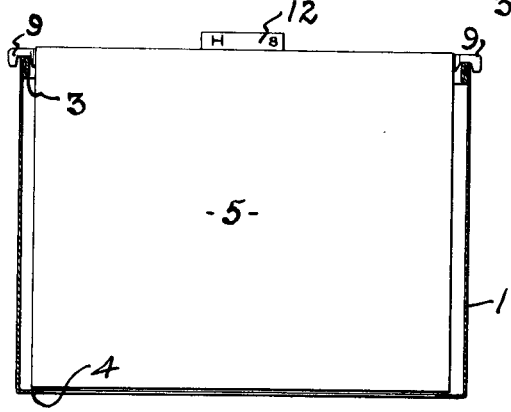
Figure 2 is a cross-sectional view taken on the line 2—2 of Figure 1.
Figure 3:
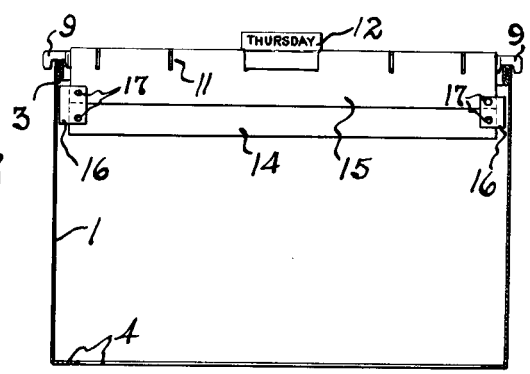
Figure 3 is a cross-sectional view taken on the line 3—3 of Figure 1.

A complete unit in accordance with this invention is illustrated in Figures 1 to 3 inclusive. In the form shown the unit includes a casing or housing of rectangular form made by bending a single sheet 1 of suitable material such as fibre board or metal into an open rectangle and securing the ends together as by a seam as indicated at 2. The lower edges of the walls of the shell thus formed are turned inwardly to form the flanges 4 which serve as a base for the shell and to aid in reinforcing the walls. The upper edges of the walls are beaded over as indicated at 3 to further strengthen the structure, give it a finished appearance and to provide a retaining ledge or rail as will be explained later. Supported on the beaded edge or rail 3 of an opposite pair of walls are a plurality of filing folders which depend from bars or rods which fit over the beaded edges of the walls as shown in these figures. The filing pockets hang down within the shell so as to be protected thereby and to impart a neat appearance thereto. By this arrangement a readily handled unit is provided which may be easily transported and stored, as for example in a desk drawer, a filing cabinet drawer, or the like.

As shown in Figures 4 to 7 inclusive each filing folder consists of a sheet 5 of suitable fibrous or fabric material which is in the form of a rectangular strip folded along a medial line as indicated at 6 to form a V-shaped receptacle. The upper free edges of the walls 5 of the pocket thus formed are folded over inwardly into the pocket as indicated at 7 and fastened down in place either by staples, sewing, gluing or the like, so as to form tubular passages at the fold. Within the passages thus formed are space bars or rods 8 which are shown in the preferred form of flat narrow strips of some suitable material such as metal which are long enough to project at both ends, as is clear from Figure 4. The projecting ends of each strip are offset in opposite directions as indicated at 10 and clearly shown in Figure 6, and are cut to form hooks 9. The hooks are so proportioned that they will fit nicely over the beaded edges 3 of the open shell so as to be slidable therealong. The ends of each strip are offset in opposite directions so that they will not be displaced from the tubes within which they are mounted. An advantage of this construction is that when one of these strips 8 is put in place with the hooks opening downwardly they cannot be put in improperly in relation to the other strip in each folder and in relation to the strips of the other folders. In other words, if both ends were offset in the same direction they could be mounted in place so as not to nest with respect to each other in the uniform manner indicated in Figure 7.

The inner side of the strip 2 of one of the walls is provided with a series of slots 11 into which index tabs 12 may be mounted in various positions transversely of the folder. The index tabs 12 are preferably made of some transparent material such as is commonly employed for this purpose and shaped to form a receptacle for a data slip. They are provided with side ears 13 which are adapted to be slipped into an adjacent pair of slots 11 to support the index tab in place. When a group of these folders are used together as indicated in Figure 1, these tabs may be placed relative to each other so as to be fully visible. By forcing the ears 3 into the slots 11 the strips 8 are further crowded in the tubular passages which contain them so as to aid in holding them in place. This arrangement insures against longitudinal displacement of the strips 8 which is a desirable practical feature of this arrangement.

In order to divide these folders into designated groups special strips are provided of a type illustrated in Figures 1 and 2. These strips, made of a suitable fibrous or metallic sheet are folded over at the top edge to form a rear wall 14 and a folded over flat or front wall 15. In the case of flexible fibrous material these two walls may be united by riveting, sewing or cementing, or in the case of metal by soldering, welding or the like to unite them together. They are so connected that as before a tubular channel extends along the folded upper edge to receive a strip 8 as before having the hooks 9 offset in opposite directions as previously explained. The slots 11 are provided as before to receive the tabs 12 which contain designating strips for the various groups of folders.

Secured at the end edges of this divider and spaced below the hooks are the plates 16 which are secured by rivets or welding as indicated at 17. An important feature with respect to the divider is found in the fact that the plates 16 are of different size or are so placed that the space between the upper end of one plate and the lower edge of the bead or shoulder 3 is greater than that between the other plate and bead. This is apparent from Figure 3, wherein the right hand plate 16 is shorter than the left hand plate to provide this greater space, the space between the plate and bead at the left hand side is just slightly less than the length of the hook, while the space between the plate and bead at the right hand side is a little greater than the depth of the hook. The result is that it is impossible to dislodge the divider from the support no matter how roughly it is handled while allowing free sliding movement of the divider on the supporting rails. However, when it is desired to remove the divider from the casing the right hand end, Figure 3, is swung forwardly or backwardly until the plate 16 is free of the bead whereupon that end may be raised and the other end disengaged. The plate 16, of course, may be built integral with the material of either the front or back walls 14 and 15 of the dividing strip or both, as desired.

Figures 8 to 11 inclusive show a modified form of folder with particular relation to the form of tab and its attachment. In this case the channel formed by the upper edge of the back wall by the folding over of the top edge 7' of the back wall and the securing thereof to the back wall 5', is notched clear through at a plurality of places as indicated at 11'. The index tax in this case shown at 12' consists of a single sheet of suitable transparent material which is folded over at opposite edges, overlapped at the free edges, and secured together in any suitable way as by rivets or staples as indicated at 18'. With this arrangement upper and lower pockets A and B are formed. The upper pocket is provided to receive the usual data slip. The folded edge of the lower pocket B is cut away at the ends and intermediate the ends so that only the portions 19 of the lower ends remain. The space between the remaining portions 19 of the folded edge and the width of these portions is such that the tab can be slipped down over the portion of the rear wall of the filing folder between any pair of notches 11'. In other words, any one of the tabs T between a pair of notches 11' is passed up between the front and rear walls of the pocket B between the edges 19 and the strip 8 is then threaded through the tubular channel along the top edge of the back wall of the filing folder and through the index tab so as to lock it in place. The tab itself contributes frictionally to any tendency of the strip 8 to slip out, thereby augmenting the function of the oppositely offset ends of the strip. Indeed, the index tab is so efficient for this purpose that practically flat strips 8, that is, without offset ends, are clearly held in place.

As before, by providing a plurality of notches 11', the index tabs may be mounted at various points transversely of the folder.

In the arrangement shown in Figures 12, 13, the back wall of the filing folder is formed as in the case of the arrangement of Figure 8, but in this case the notches 11" extend sufficiently below the lower edge of the strip 8 so that rivets may be passed thereunder. In this case the index tab, preferably as before made of transparent material, is folded over as indicated in Figure 14 and secured by staples or rivets 18 to form the upper pocket A and a pair of flaps 20. A data strip is exposed through the front wall 12" of the pocket A. These flaps are provided with holes 21 and when the flaps are slipped over the back wall of the file folder rivets may be placed through the holes 21 and under the strip 8. This locks the index tab in place and serves to crowd the strip 8 in its channel so as to aid in preventing its accidental removal.

In the arrangement of Figures 15 and 16 the filing folder pocket is formed as before. In this case, however, the top edge of the back wall is folded inwardly upon itself to form a double edge 7' which is partially cut away at the sides to form a projecting tab 24. The supporting strip 8 in this case is merely applied to the back face of the back wall at the folded portion and riveted in place by means of eyelets 23. The strip 8 for the front wall is simply riveted along the back face of the front wall along its upper free edge. The relative positions of these parts is clearly shown in Figure 16.

The final arrangement is shown in Figures 17 and 18. In this arrangement a folder like that of Figure 15 may be employed, or where desired the upper edge of the back wall need not be folded over on itself but remain of single thickness. In either case portions of the top edge are cut away to leave the index tab 25. The suspension bars for the filing folder in this case differ from those of the previous arrangements in that they consist of a U-shaped or channel strip of suitable material 26 which is fitted down over the upper free edges of the front and back walls and clamped in place as clearly indicated in these figures. The ends may be shaped to form the terminal hooks 27 as before. With this arrangement the ends need not be offset. By this construction the suspension bars 26 have the added function of finishing off and protecting the free edges of the front and back walls. When desired, integral ears may be struck out of the bars or indentations made in them to aid in locking them in place.

From the above description it will be apparent to those skilled in the art that the various features of the invention herein disclosed are subject to variations without departure from the scope of the novel subject matter hereof. I do not, therefore, desire to be strictly limited to this disclosure which has been given for illustrative purposes, but rather to the scope of the claims granted me.

What is claimed is:

1. A filing folder of the type described, consisting of a sheet of flexible material folded along a medial line to form front and back walls, the upper terminal edges of said walls being folded on themselves to form tubular channels and suspension strips lying in said channels and projecting at each end, the projecting ends of each strip being offset from the plane of the strip to hold the strips in their respective channels.

2. A filing folder of the type described, consisting of a sheet of flexible material folded along a medial line to form front and back walls, the upper terminal edges of said walls being folded on themselves to form tubular channels, and suspension strips lying in said channels and projecting at each end, the inner wall of one of said channels having a plurality of slots and a removable index tab mounted in a pair of said slots, said index tab acting to hold the associated strip in its channel.

3. A filing folder of the type described, comprising a sheet of flexible material folded along a medial line to form front and back walls, the upper ends of said front and back walls being folded upon themselves to form tubular channels, the walls of one of said channels being notched, a supporting bar lying in each of said channels, and a removable index tab secured in place at a pair of said notches by the passage of one bar through its channel.

4. A division strip for a filing unit as described, consisting of a strip of flexible material having a pair of ears projecting from each end thereof and spaced different distances vertically with respect to each other.

5. A structure of the type described, comprising a sheet of flexible material having one edge thereof folded and secured upon itself to form a tubular channel, the walls of said channel being notched, a supporting bar lying in said channel, and a removable index tab secured in place at at least one of said notches by the passage of said bar through said channel.

6. A guide strip for a filing unit as described, consisting of a strip of suitable material having an ear projecting from each end thereof and plates secured on said strip and projecting beyond the ends thereof in spaced parallel relation to said ears, one of said plates being closer to the adjacent ear than the other is to its adjacent ear.

7. A filing folder or divider strip of the type described made of a sheet of flexible material formed into a tubular channel at one edge, having a bar lying in said channel and projecting at each end, the projecting ends being offset in opposite directions from the plane of the bar to hold it in the channel.

8. A filing unit of the type described including a pair of spaced parallel rails, a divider comprising a strip of flexible material having a pair of projecting hooks at its ends resting on said rails, and plates on said strip at its ends projecting under said rails, one of said plates being spaced a greater distance with respect to its associated hook than the other, thereby preventing accidental displacement of said strip from the rails while allowing intentional disengagement therefrom when the strip is flexed.

9. In an article of manufacture, a division strip for a filing unit for use with supporting rails as described comprising a body strip of flexible material having a pair of oppositely offset ears projecting from the respective ends thereof, said ears forming hooks, plates secured to said strip below said ears, the spacing between one of said plates and its associated ear being less than the depth of the supporting rail to be associated with it, and the spacing between the other plate and its associated ear being greater than the depth of the supporting rail to be associated with it, and a detachable index tab mounted on said strip at its upper edge.

FRANK D. JONAS.